(12) United States Patent
Hatton

(10) Patent No.: US 11,242,183 B2
(45) Date of Patent: Feb. 8, 2022

(54) SOUND EMITTING BOTTLE CAP

(71) Applicant: Twist 'n' Shout Ltd., Reading (GB)

(72) Inventor: Malcolm Wallace Hatton, Reading (GB)

(73) Assignee: Twist 'N' Shout, Berkshire (GB)

( * ) Notice: Subject to any disclaimer, the term of this patent is extended or adjusted under 35 U.S.C. 154(b) by 102 days.

(21) Appl. No.: 16/636,138

(22) PCT Filed: Aug. 3, 2018

(86) PCT No.: PCT/IB2018/055878
§ 371 (c)(1),
(2) Date: Feb. 3, 2020

(87) PCT Pub. No.: WO2019/026051
PCT Pub. Date: Feb. 7, 2019

(65) Prior Publication Data
US 2020/0172306 A1 Jun. 4, 2020
US 2021/0188503 A9 Jun. 24, 2021

Related U.S. Application Data

(60) Provisional application No. 62/541,501, filed on Aug. 4, 2017.

(51) Int. Cl.
*B65D 51/24* (2006.01)
*B65D 41/04* (2006.01)
*G01L 19/12* (2006.01)

(52) U.S. Cl.
CPC .......... *B65D 51/248* (2013.01); *B65D 41/04* (2013.01); *G01L 19/12* (2013.01)

(58) Field of Classification Search
CPC .. B65D 51/248; B65D 51/24; B65D 51/1683; B65D 51/1688; B65D 51/1672;
(Continued)

(56) References Cited

U.S. PATENT DOCUMENTS 3,203,136 A 8/1965 Scray et al.
5,402,905 A * 4/1995 Couch ................ B65D 51/1611
215/309
6,299,006 B1 10/2001 Samonek

FOREIGN PATENT DOCUMENTS

CN 101945810 A 1/2011
DE 20 2009 000606 3/2009
(Continued)

OTHER PUBLICATIONS

International Search Report and Written Opinion dated Nov. 16, 2018 in International Appln. No. PCT/IB2018/055878.

*Primary Examiner* — Robert J Hicks
(74) *Attorney, Agent, or Firm* — Arnold & Porter Kaye Scholer LLP

(57) ABSTRACT

The present disclosure describes speech or sound-emulating bottle cap apparatuses and systems and methods for manufacture thereof. It will be understood that a bottle cap prohibits gases from escaping a pressurized bottle. Ordinarily, when the cap is removed from the bottle, the escaping gas will emit a sound, but the sound carries no discernable meaning, cognizable message or recognizable sound (aside from gas simply escaping a pressurized container). Embodiments described herein harness gas escaping from a bottle (when the cap is removed) to generate a discernable meaning, cognizable message or otherwise recognizable sound. The sound-chamber may be wrapped or twisted into a coil or helix shape (in addition or as an alternative to miniaturizing it). A coil or helix shape permits recovery of the original sound quality of the initially modeled sound-chamber, resulting in "a sound-emitting cap-chamber" removably or permanently coupled to a bottle cap or bottle as described herein.

20 Claims, 14 Drawing Sheets

(58) Field of Classification Search
CPC ............... B65D 51/16; B65D 51/1661; B65D 51/1611; B65D 41/04; G01L 19/12; G01K 7/06
USPC ................. 215/228, 314, 311, 307, 308, 44; 220/203.19, 203.01, 202, 374, 373, 367.1, 220/253; 116/70, 112, 137 R, 268, 266, 116/264
See application file for complete search history.

(56) References Cited

FOREIGN PATENT DOCUMENTS

| | | | |
|---|---|---|---|
| FR | 2176302 | A5 | 10/1973 |
| JP | 2000085779 | A | 3/2000 |
| NL | 8 001 976 | A | 11/1987 |

* cited by examiner

400

SOUND EMITTING BOTTLE CAP

CROSS-REFERENCE TO RELATED APPLICATION

This application is a national phase application based on International Application No. PCT/IB2018/055878, filed Aug. 4, 2018, which claims priority to U.S. Provisional Application No. 62/541,501, filed Aug. 4, 2017, both of which are incorporated in their entireties herein.

FIELD OF THE DISCLOSURE

The subject matter discussed herein relates generally to bottle caps and bottles, and systems and methods of designing and manufacturing bottle cap assemblies. In particular, the present disclosure describes speech or sound-emulating bottle cap apparatuses and systems and methods for manufacture thereof.

BACKGROUND

Bottle caps are generally used to create a more or less impermeable seal in order to protect and enclose bottle content, which is particularly beneficial for maintaining freshness or keeping the contents under pressure, as in carbonated beverages. When bottle caps are removed from the top of a pressurized bottle, gas (typically $CO_2$) is released after a seal between the cap and the bottle is broken. The sound of escaping gas is a relatively recognizable, natural sound, but the escaping gas carries no discernable meaning, cognizable message or recognizable sound (aside from gas simply escaping a pressurized container).

SUMMARY

The present disclosure describes speech or sound-emulating bottle cap apparatuses and systems and methods for manufacture thereof. It will be understood that a bottle cap prohibits gases from escaping a pressurized bottle. Ordinarily, when the cap is removed from the bottle, the escaping gas will emit a sound, but the sound carries no discernable meaning, cognizable message or recognizable sound (aside from gas simply escaping a pressurized container). Embodiments described herein harness gas escaping from a bottle (when the cap is removed) to generate a discernable meaning, cognizable message or otherwise recognizable sound. The sound-chamber may be wrapped or twisted into a wrapped, coiled, or helix shape, or the like (in addition or as an alternative to miniaturizing it). A coil or helix shape permits recovery of the original sound quality of the initially modeled sound-chamber, resulting in "a sound-emitting cap-chamber" removably or permanently coupled to a bottle cap or bottle as described herein.

In some embodiments, a sound-emitting cap-chamber system comprises a sound-chamber having a substantially wrapped shape, and comprises a first hole at a bottom end of the sound-chamber; a second hole at a top end of the sound-chamber; a vibrating mechanism situated at the first hole and configured to generate one or more sound waves from a pressurized gas entering the first hole; and a cap of a bottle, configured to cover the sound-chamber and comprising a port hole.

In some aspects of such embodiments, the sound-chamber defines a cavity space that is internal to the sound-chamber, and further comprises one or more protrusions into the cavity space of the sound-chamber; and each of the one or more protrusions of the sound-chamber is defined by a diameter that may be different from a diameter of at least one of the first hole and the second hole, thereby disturbing the one or more sound waves from the pressurized gas to generate a series of sounds having audible characteristics defined by the one or more protrusions.

In some aspects of such embodiments, the cap further comprises a catch; and the sound-chamber further comprises a track configured to accommodate the catch of the cap.

In some aspects of such embodiments, the cap further comprises a rotation pin on an underside of the cap; and the sound-chamber further comprises a rotation hole configured to accommodate the rotation pin of the cap.

In some aspects of such embodiments, the rotation hole is configured to facilitate a rotation motion of the cap, and the track is further configured to facilitate travel of the catch a length of the track.

In some aspects of such embodiments, the first hole is configured to align with the port hole of the cap at a first travel distance of the rotation motion of the cap, and the pressurized gas escapes through the port hole and the first hole via the sound-chamber upon alignment of the first hole and the port hole.

In some aspects of such embodiments, the sound-emitting cap-chamber system further comprises a first seal situated between a top surface of the sound-chamber and an underside of the cap, surrounding the top surface of the sound-chamber, and configured to inhibit the pressurized gas from escaping via a space between the top surface of the sound-chamber and the cap.

In some aspects of such embodiments, the sound-emitting cap-chamber system further comprises a second seal situated between a top surface of the sound-chamber and an underside of the cap, surrounding the second hole, and configured to inhibit the pressurized gas from escaping via a space at the second hole between the top surface of the sound-chamber and the underside of the cap.

In some aspects of such embodiments, the vibrating mechanism is configured to vibrate in response to pressurized gas entering the sound-chamber via the first hole.

In some aspects of such embodiments, the sound-emitting cap-chamber system further comprises a gas intake attached to the first hole, wherein the first hole comprises the vibrating mechanism.

In some aspects of such embodiments, the cap further comprises one or more threads configured to affix the cap to the bottle via one or more corresponding threads of the bottle.

In some embodiments, a sound-emitting cap-chamber apparatus comprises a conduit defining a cavity space therein, the cavity space having a substantially wrapped shape and comprising one or more protrusions therein; a first hole situated at a bottom end of the conduit; a second hole situated at a topside of the apparatus and at a top-end of the conduit; and a vibrating mechanism situated at the first hole and configured to generate one or more sound waves from a pressurized gas entering the first hole.

In some aspects of such embodiments, each of the one or more protrusions of the cavity space is defined by a diameter that may be different from a diameter of at least one of the first hole and the second hole, thereby disturbing the one or more sound waves from the pressurized gas to generate a series of sounds having audible characteristics defined by the one or more protrusions.

In some aspects of such embodiments, the sound-emitting cap-chamber apparatus further comprises a track defined by an impression in the topside of the apparatus and accommodates a catch of the cap.

In some aspects of such embodiments, the sound-emitting cap-chamber apparatus further comprises a rotation hole configured to accommodate a rotation pin of the cap.

In some aspects of such embodiments, the rotation hole is configured to facilitate a rotation motion for the cap, and the track is further configured to facilitate travel of the catch a length of the track.

In some aspects of such embodiments, the first hole is configured to align with a port of the cap at a first travel distance of the rotation motion of the cap, and the pressurized gas escapes through the port and the first hole via the conduit upon alignment of the first hole and the port.

In some aspects of such embodiments, the sound-emitting cap-chamber apparatus further comprises a first indentation circumscribing the topside of the apparatus and configured to accommodate a first seal.

In some aspects of such embodiments, a second indentation circumscribes the second hole situated at the topside of the apparatus and configured to accommodate a second seal.

In some aspects of such embodiments, the vibrating mechanism is configured to vibrate in response to pressurized gas entering the conduit via the first hole.

DETAILED DESCRIPTION

Certain illustrative aspects of the systems, apparatuses, and methods according to the present disclosure are described herein in connection with the following description and the accompanying figures. These aspects are indicative, however, of but a few of the various ways in which the principles of the systems, apparatuses, and methods may be employed, and the present disclosure is intended to include all such aspects and their equivalents. Other advantages and novel features of the present disclosure may become apparent from the following detailed description when considered in conjunction with the figures.

In the following detailed description, numerous specific details are set forth in order to provide a thorough understanding of the present disclosure. In other instances, well known structures, interfaces, and processes have not been shown in detail in order not to unnecessarily obscure the systems, apparatuses, and methods according to the present disclosure. However, it will be apparent to one of ordinary skill in the art that those specific details disclosed herein need not be used to practice the systems, apparatuses, and methods according to the present disclosure and do not represent a limitation on the scope thereof, except as recited in the claims. It is intended that no part of this specification be construed to effect a disavowal of any part of the full scope of the present disclosure. Although certain embodiments of the present disclosure are described, these embodiments likewise are not intended to limit the full scope of the systems, apparatuses, and methods according to the present disclosure.

The present disclosure describes speech or sound-emulating bottle cap apparatuses and systems and methods for manufacture thereof. It will be understood that a bottle cap prohibits gases from escaping a pressurized bottle. Ordinarily, when the cap is removed from the bottle, the escaping gas will emit a sound, but the sound carries no discernable meaning, cognizable message or recognizable sound (aside from gas simply escaping a pressurized container).

The present disclosure describes apparatuses, methods and systems for harnessing the gas escaping from a pressurized bottle (when the cap is removed) to generate a discernable meaning, cognizable message or otherwise recognizable sound.

Figure 5:
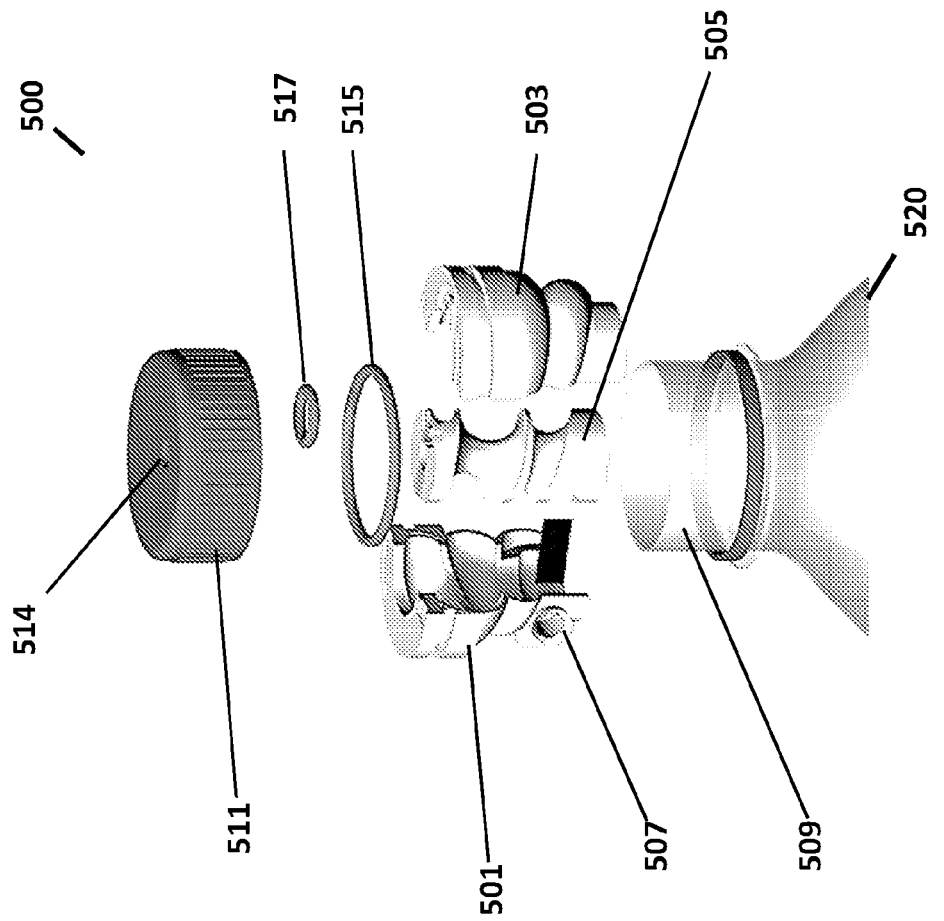
FIG. 5 shows blown-up components of a sound-emitting cap-chamber apparatus being inserted into a mouth of a bottle, according to an exemplary embodiment.

According to one exemplary embodiment of the present disclosure, a sound-emitting cap chamber may be coupled to a bottle cap. According to this embodiment, the sound-emitting cap-chamber may comprise a sound-chamber and a vibrating mechanism, such that when pressurized gases are applied to one end of the sound-chamber (the "input gases"), the gas will flow through the sound-chamber and across the vibrating mechanism, resulting in the emission of a noise (the "output sound"). In one embodiment, as shown in FIG. 5, the sound-emitting cap chamber may be affixed to the underside of a bottle cap, such that the sound-emitting cap chamber is inserted into the mouth of the bottle when the cap is attached to the bottle.

It should be understood that when the input gases, e.g., pressurized gas, are forced through a sound-chamber, characteristics of the sound-chamber (e.g., the size, shape, material) will affect an outputted audible sound by disrupting and altering sound waves from the gas moving through the sound-chamber. In some cases, the sound-chamber may be modeled or "drawn" using software, such as computer-aided design (CAD) software, to produce a rendering of the sound-chamber. The same or different software may be used to generate a waveform model of the output sound that the sound-chamber would produce if inputted gases were forced through the sound-chamber. As depicted in, for example, FIG. 1 and FIG. 11, a sound-chamber is typically configured as a long passage, with a fixed or varying diameter through the length of the passage (sometimes referred to as a "sound-chamber," "cavity space," or "conduit"). The output sound is a function of characteristics of the sound-chamber, such as the length of the passage, the diameter of the passage, and the incremental change in diameter of the passage (if any), where such changes in the diameter of the diameter can result from protrusions into the negative space of the interior of the sound-chamber. When gas escapes the depressurized bottle, the gas impacts a vibrating mechanism that generates physical pressure waves disrupting the natural, even flow of the escaping gas. As the gas proceeds through the sound-chamber, the protrusions change the characteristics of the audible output sound that the escaping gas emits into the ambient space, thus changing the pressure (and audible output sound) in the air as detected by a person's ear drum.

As mentioned, a vocal chamber (sometimes referred to as a "vowel" chamber) may be modeled such that its structure mimics that of a human vocal cord, or otherwise has a structure, capable of generating a desired audible output for a sound-emitting cap chamber. It will be understood that in embodiments wherein a sound-emitting cap chamber is inserted into the mouth of a bottle, under the bottle cap, the sound-emitting cap chamber must be appropriately sized to fit within the dimensions of the bottle mouth. Depending on the desired sound effect, this may require a sound-chamber of the sound-emitting cap chamber to result from miniaturizing the initially-modeled dimensions of the vocal chamber. As dimensions of the sound-chamber are shrunk, waveform-modeling software may be used to confirm the predicted output sound for the sound-chamber in an iterative design process.

However, as a sound-chamber's dimensions are miniaturized, the pitch and/or overall sound quality produced by the re-sized sound-chamber may rise and/or the general sound quality may be negatively affected. Production research shows that, in most any embodiment used to model a sound-chamber and a desired waveform, the ultimate desired sound will be lost when a length dimension of a conventional linear sound-chamber is below about 122 mm (with some variation of more or less 12 mm, depending upon the complexity of the desired sound).

Figure 2:
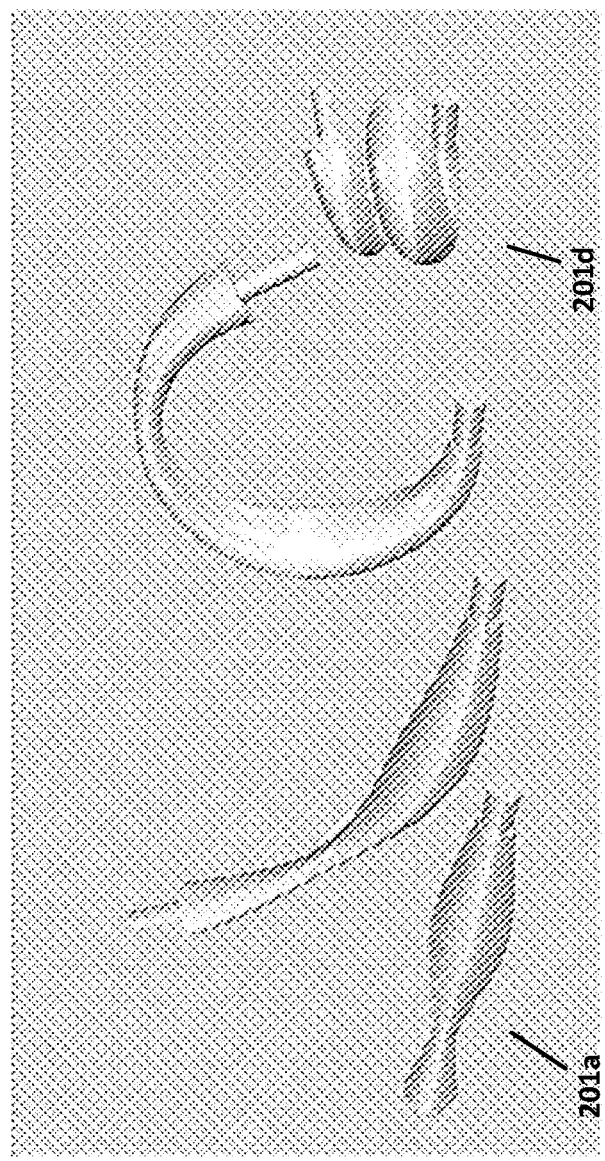
FIG. 2 shows a conceptual example of coiling a mold for a sound-chamber during modeling, according to an exemplary embodiment.

Therefore, in certain embodiments, it may be desirable to wrap or twist a sound-chamber into a helix shape (in addition or as an alternative to miniaturizing it), as depicted in FIG. 2. Use of this helix shape permits recovery of some or all of the original sound quality of the initially modeled sound-chamber, thereby resulting in a model of "a sound-emitting cap-chamber" configured to removably or permanently couple to a bottle cap or bottle as described herein. Using waveform-modeling software, a waveform for the model of the sound-emitting cap-chamber may be produced and re-produced, as needed, until the resulting waveform models the desired output sound. Although embodiments described herein mention a helix shape, coil shape (e.g., spiral), or otherwise wrapped shape, one having skill in the art will appreciate other geometries of a sound-chamber having repeated convolutions may be used. In addition to wrapping or twisting the sound-chamber to recover the sound quality after miniaturization, other aspects of the structure and geometry may be altered. For example, a modeled vocal chamber may be 8 inches, and may be miniaturized down to 122 mm. To recover the desired audible output, the internal structure (e.g., protrusions into the negative space of the sound-chamber) may be miniaturized proportionally or may be altered in structure, such that, for example, a particular protrusion within the 122 mm sound-chamber may not be exactly proportional in structure to the particular protrusion's structure within the modeled vocal chamber at 8 inches. Additionally or alternatively, the alteration of the geometry may include, for example, altering the scale and/or frequency of protrusions into the negative space of the sound-chamber to recover the desired audible output that would otherwise be lost through miniaturization.

Once the size and shape of the sound-chamber has been satisfactorily determined, the sound-chamber may be manufactured. Exemplary processes for manufacturing sound-chambers, and suitable materials therefore, are described in greater detail below; as noted below, in certain embodiments, it may be desirable to create a production mold, such as an injectable mold, for the sound-emitting cap-chamber based on the model of the sound-emitting cap-chamber.

Figure 7:
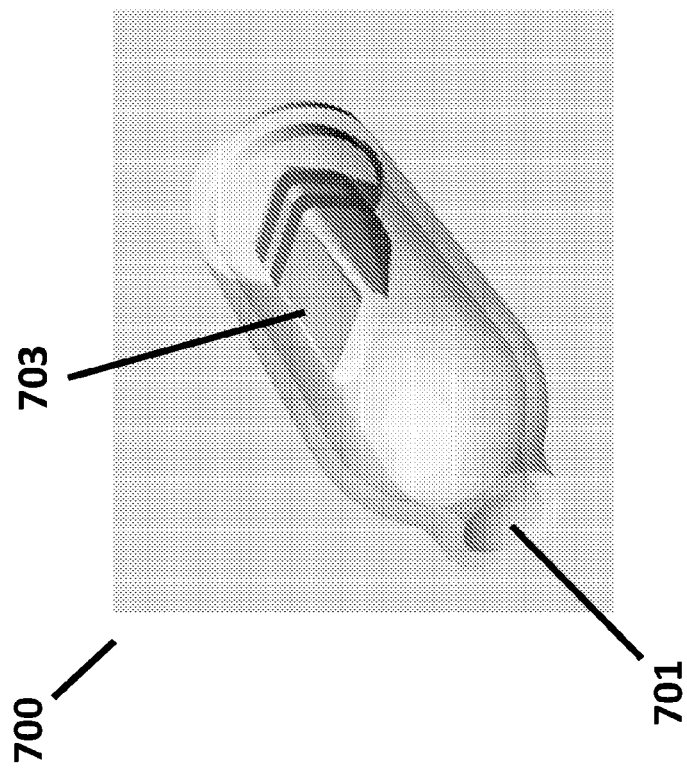
FIG. 7 shows a gas intake having a vibrating mechanism, according to an exemplary embodiment.
Figure 9:
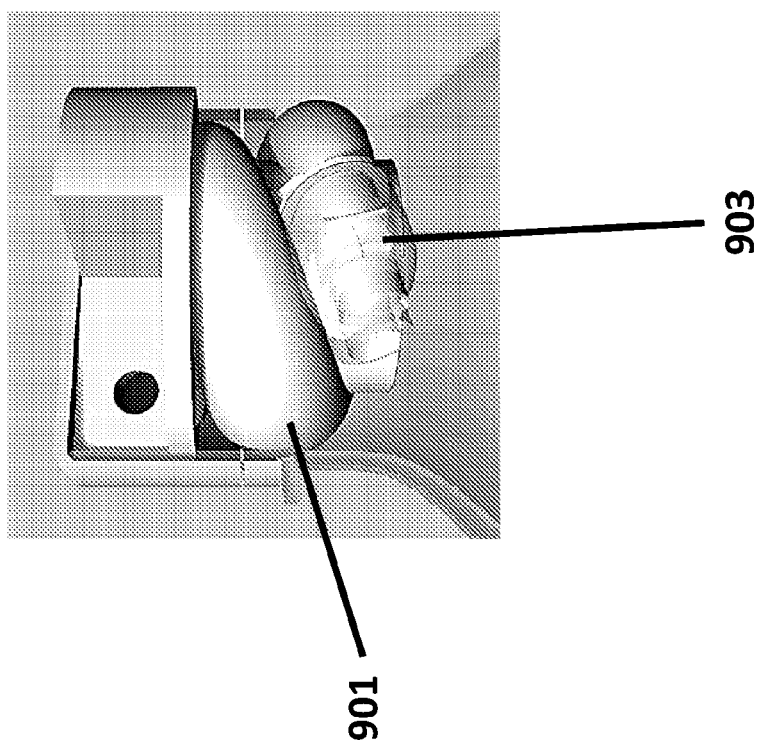
FIG. 9 shows an exemplary sound-emitting cap-chamber comprising a reed component, similar to the gas intake shown in FIG. 7.

A vibrating mechanism, according to the present disclosure, may be coupled to a sound-chamber so as to cause a change in air pressure that, in conjunction with the configured sound-chamber, creates the desired output sound. FIG. 7 shows a vibrating mechanism (e.g., reed component) that attaches at or within the gas intake at the distal end of a sound-chamber, according to an exemplary embodiment. When the sound-chamber and the vibrating mechanism are aligned, such that input gases flow through the sound-chamber, the gases cause the vibrating mechanism to create the output sound. One having skill in the art would appreciate that the vibrating mechanism may be made of any material capable of vibrating to produce the desired sound through the sound-emitting cap-chamber as a result of the escaping gas. Non-limiting examples may include plastic (e.g., high or low density polyethylene, polypropylene), metal (e.g., aluminum, steel), and wood (e.g., reed, balsa). FIG. 9 shows an exemplary sound-emitting cap-chamber comprising a vibrating mechanism similar to the component shown in FIG. 7.

To more fully describe the design, manufacture and operation of a sound-emitting chamber cap, an exemplary embodiment is described below. In the example herein, a sound-chamber is configured to recreate a human-originated "oh" output sound when input gases are applied to the sound-chamber. Additionally, in this example, the sound-chamber is made of a material suitable for configuration via injection molding, such as plastic (e.g., high or low density polyethylene, polypropylene) or metal (e.g., aluminum, steel). A sound-chamber may, for example, be generated using an injection molding process that introduces structural characteristics of the sound-chamber; such structural characteristics may define, for example, one or more protrusions of varying diameter within the interior of the sound-chamber.

Sound-Emitting Cap-Chamber

Figure 1:
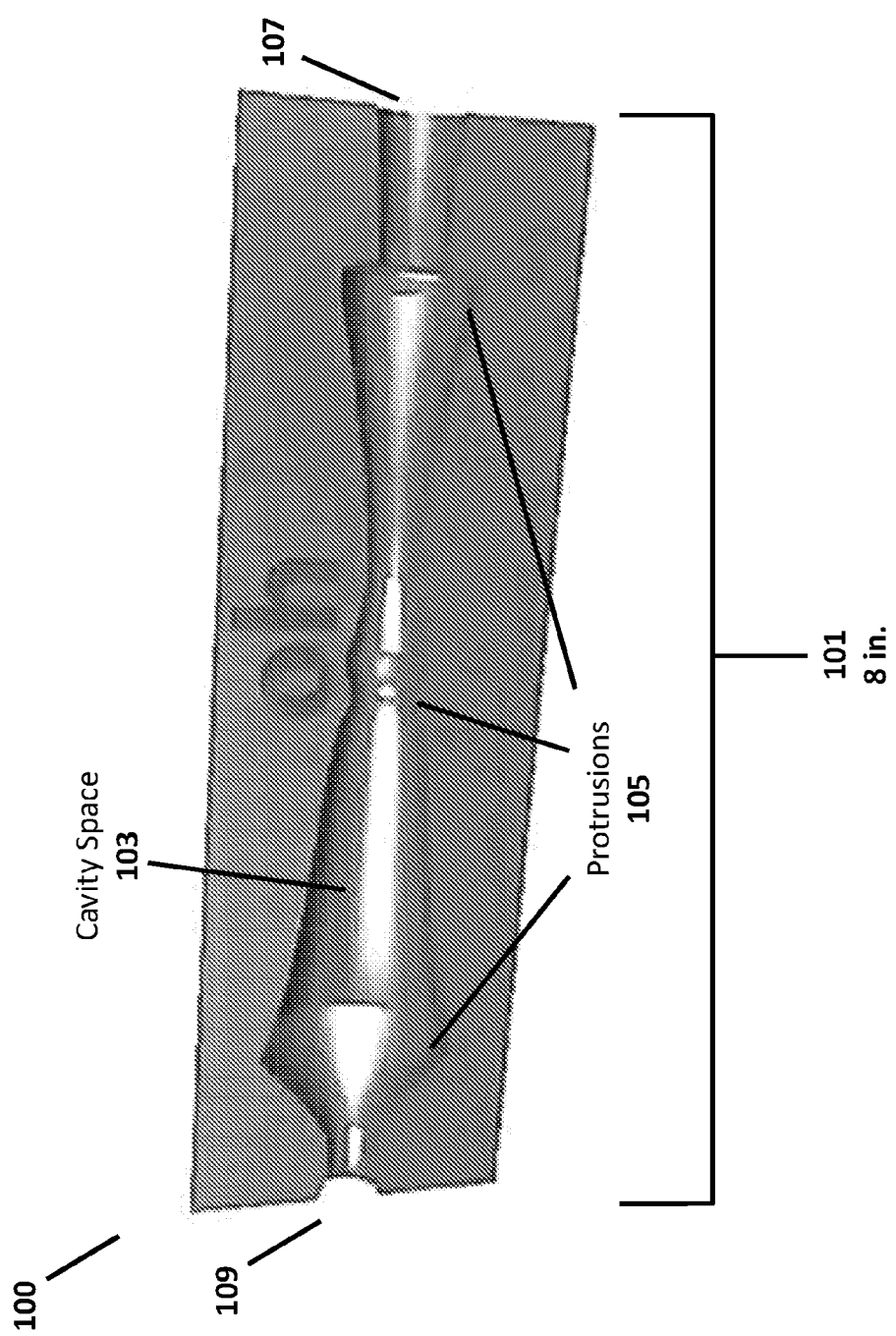
FIG. 1 shows a mold for a sound-chamber that emulates a human-originated sound when inputted gases move through the sound-chamber.

FIG. 1 shows a mold 100 for a sound-chamber 101 configured to recreate, and thus emulate, a human-originated "oh" output sound when inputted gases move through the sound-chamber 101 made from the mold 100. In order to recreate the human-originated sound, the length of the resulting sound-chamber 101 shaped by the mold 100 may be roughly the length of a human vocal passage (e.g., 8 inches). However, as mentioned above, if the dimensions of a sound-chamber 101 were simply shrunk proportionally to fit into the mouth of a bottle (e.g., from 8 in. to 25-30 mm), the resulting miniaturization of the sound-chamber 101 does not necessarily maintain the same quality of sound. Oftentimes, simply shrinking the sound-chamber 101 could change the pitch of the output sound and/or alter the protrusions 105 in the sound-chamber 101, resulting in an undesirable output from the sound-chamber 101. Accordingly, a way to shrink the sound-chamber 101 and maintain the sound quality is by twisting or wrapping the sound-chamber 101 into, for example, a helix shape.

One skilled in the art would appreciate that protrusions 105 into negative, cavity space 103 of a sound-chamber 101 may, in part, define the sound produced by the sound-chamber 101 when sound waves from a gas are moved through the sound-chamber 101. Changes to the protrusions 105 can change the definition and characteristics of the sound produced by the sound-chamber 101, by disrupting and altering characteristics of the sound waves resulting from the gas moving through the sound-chamber 101. When the sound-chamber 101 is shrunk, not only does the pitch of the sound produced by the sound-chamber 101 (typically) rise, but the structure of the sound-chamber 101 may be altered in such a way that the re-sized protrusions 105 degrade the quality of the intended sound or potentially eliminate the intended sound altogether. For example, a protrusion 105 may be a structural component of the sound-chamber 101 and may comprise a portion thereof, in the interior of the sound-chamber 101, and may be defined by a change in the diameter of the material within the interior of the sound-chamber 101. In particular, a sound-chamber 101 may have an entry hole 107 (sometimes called an "intake") and an exit hole 109 (sometimes called an "escape hole"), where each of the entry hole 107 and the exit hole 109 have a diameter defined by the interior aspect of the sound-chamber 101. Each protrusion 105 may have a diameter that is different from the diameters of the entry hole 107 and/or the exit hole 109. Put another way, each protrusion is defined by the diameter of the internal cavity space 103 at a given location. One having skill in the art will appreciate that the material of a sound-chamber 101 may include a plastic, a metal, a ceramic, or other material that is capable of conducting sound-waves and that is non-toxic when contacting a liquid in a bottle.

As previously mentioned, to counter negative effects of shrinking a sound-chamber 101, the sound-chamber 101 may be coiled or wrapped into a substantially coil shape or otherwise wrapped shape, to maintain some or all of the characteristics of the sound-chamber 101 (e.g., proportionate length, diameter of internal cavity space 103 and variations of the diameter thereof, integrity of a larger sound-chamber). Modeling software may be used to model the helical sound-chamber and predict the likely audible output or waveform from the helical sound-chamber 101 until the desired output sound character is achieved.

FIG. 2 shows a conceptual example of coiling a mold for a sound-chamber 201 during modeling, according to an exemplary embodiment. FIG. 2 shows the conceptual stages of how an initial model for a sound-chamber 201a would appear until a resulting coiled model for the sound-chamber 201d is rendered. The coiled model for the sound-chamber 201d may become the ultimate manufacturing mold for the sound-emitting cap-chamber apparatus configured to couple to a bottle cap.

Figure 3:
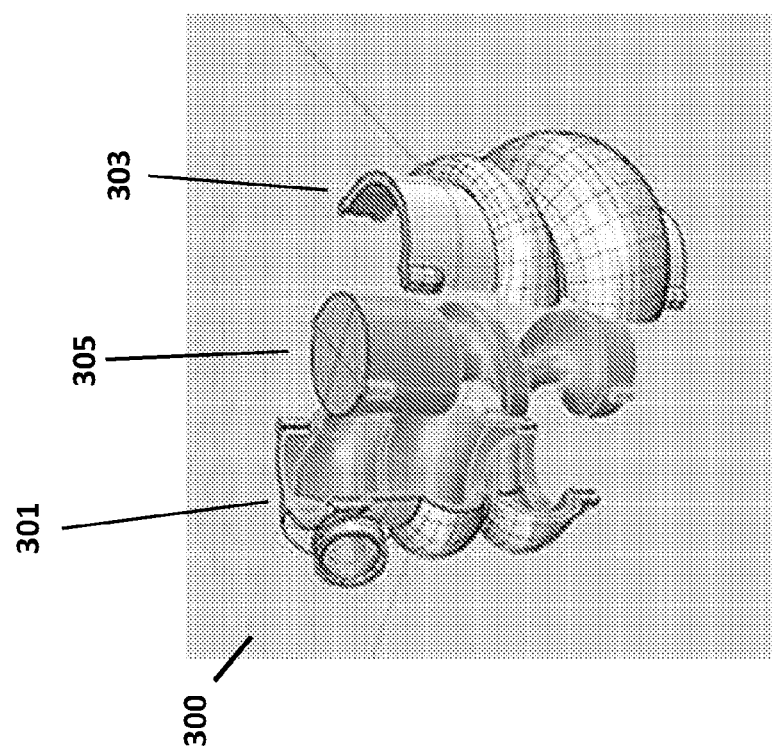
FIG. 3 shows an exemplary mold of a sound-emitting cap-chamber apparatus.

FIG. 3 shows an exemplary mold of a sound-emitting cap-chamber 300 apparatus, exploded to show the internal structure of the sound-chamber, comprising a first portion 301, a second portion 303, and a central portion 305. The first portion 301, the second portion 303, and the central portion 305 may each have one or more protrusions of a sound-chamber model, like that of FIG. 1, shrunk to a size to fit into a bottle and coiled over, as in FIG. 2. When the first portion 301 and the second portion 303 are joined about the central portion 305, a sound-chamber results from the negative space (including the protrusions into the negative space) created when the portions 301, 303, 305 are joined. That is, a hollow conduit (e.g., tube, pipe), which is wrapped or coiled, may be formed when the portions 301, 303, 305 are joined.

Although the embodiments described herein reference and describe a first portion 301, a second portion 303, and a central portion 305, it should be appreciated that the structure of the sound chamber for the sound-emitting cap-chamber 300 may comprise any number portions. That is, the structure may comprise single molded portion or multiple molded portions.

Figure 4:
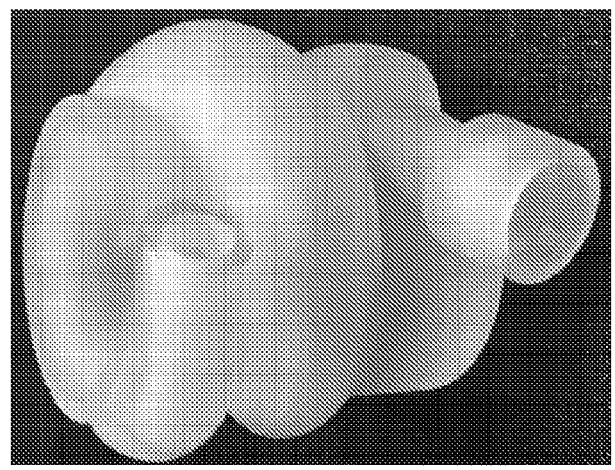
FIG. 4 shows a sound-emitting cap-chamber apparatus, according to an exemplary embodiment.

FIG. 4 shows a sound-emitting cap-chamber 400 apparatus, according to an exemplary embodiment. The sound-emitting cap-chamber 400 apparatus may result from the model and mold exemplified by FIG. 3.

FIG. 5 shows blown-up components of a sound-emitting cap-chamber 500 apparatus being inserted into a mouth 509 of a bottle 520, according to an exemplary embodiment. The sound-emitting cap-chamber 500 may comprise a first portion 501, second portion 503, and central portion 505.

Figure 5B:
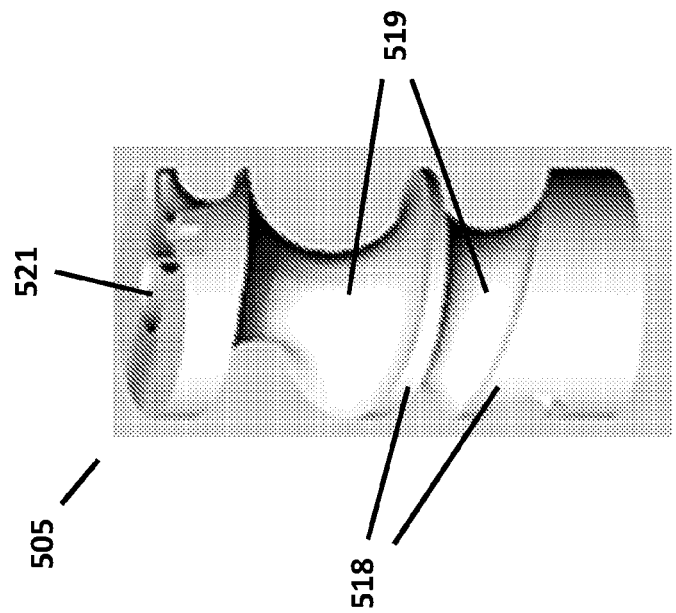
FIG. 5B is an expanded view of the central portion of the exemplary embodiment.
Figure 5A:
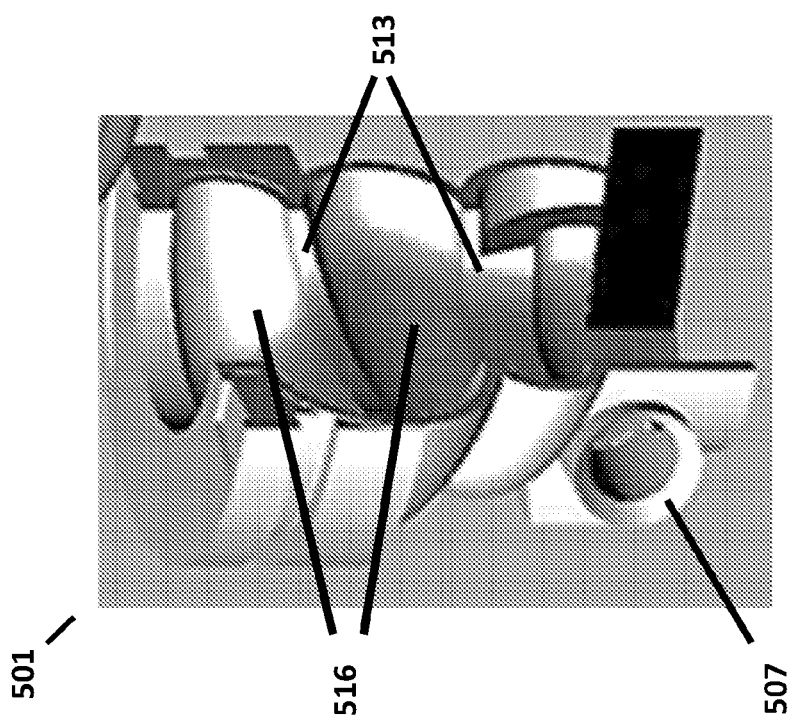
FIG. 5A is an expanded view of the first portion or the second portion of the exemplary embodiment.

As seen in FIG. 5A, the first portion 501 of the exemplary embodiment may have chamber walls 513 and an interior face 516. The chamber walls 513 may correspond with, and abut, chamber walls 518 of the central portion 505. The first portion 501 may also have sound-altering protrusions on the interior face 516, where the protrusions of the first portion 501 may correspond to protrusions on an outward face 519 of the central portion 505. It should be appreciated that a second portion 503 may have a similar or substantially identical structure to that of the first portion 501, at least with respect to chamber walls 513, an interior face 516, and protrusions of the interior face 516.

As seen in FIG. 5B, a central portion 505 of the exemplary embodiment may have a generally cylindrical shape, though other shapes may be possible in other embodiments. In this example, the central portion 505 may have chamber walls 518 and an outward face 519. The chamber walls 518 may correspond with, and abut, chamber walls 513 of the first portion 501 and the second portion 503. The outward face 519 may have sound-altering protrusions, where the protrusions of the central portion 505 may correspond to protrusions of the interior face 516 of the first portion 501 and the second portion 503. The central portion 505 may further comprise a rotation hole 521 located at a middle point therein. The rotation hole 521 may receive a rotation pin at a middle point of the bottle cap 511, such that when the rotation pin is inserted into the rotation hole 521, the bottle cap 511 may rotate (e.g., twist) as the consumer opens the bottle 520.

Figure 5C:
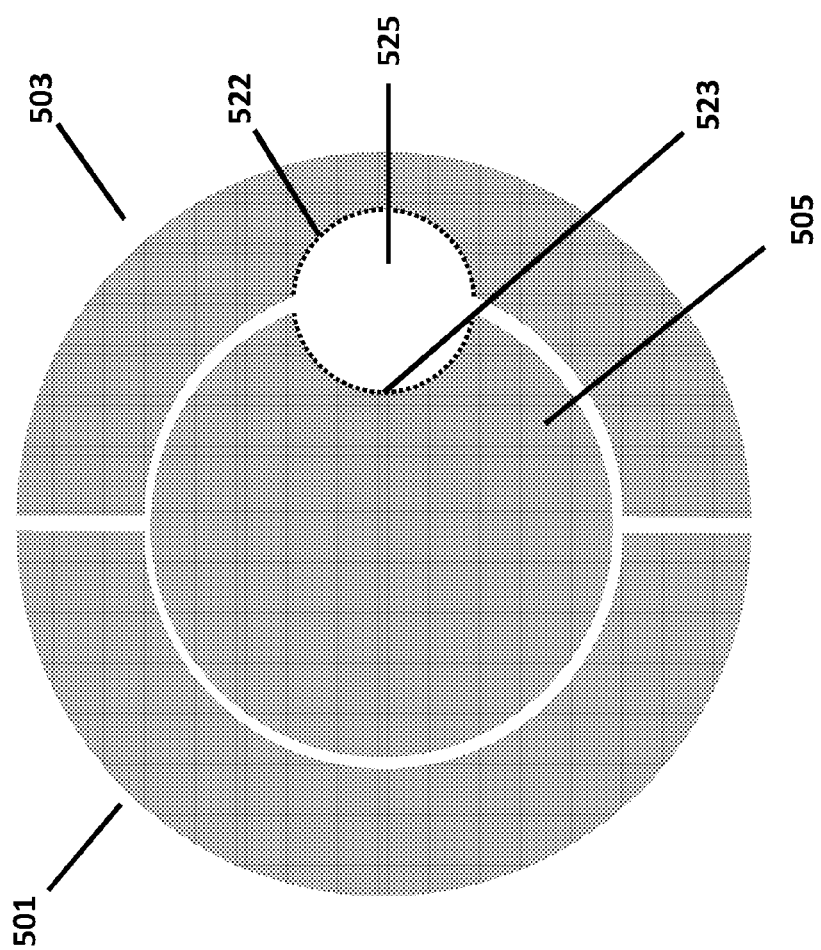
FIG. 5C is an expanded view, at a top perspective, of the first portion, second portion, and central portion of the exemplary embodiment.

As seen in FIG. 5C, a second portion 503 may have a cutout 522 and a central portion 505 may have a corresponding cutout 523. The sound-emitting cap-chamber 500 may have an escape hole 525 that allows gas to escape. The escape hole 525 may be formed when the second portion 503 and the central portion 505 are abutted. That is, the escape hole 525 may result from abutting the cutout 522 of the second portion 503 to the cutout 523 of the central portion 505.

Turning back to FIG. 5, a sound-chamber of the exemplary sound-emitting cap-chamber 500 is created from joining the first portion 501 and the second portion 503 about or around the central portion 505. The sound-chamber results from the negative space formed by the chamber walls 513 of the first portion 501 and the second portion 503 abutting the chamber walls 518 of the central portion 505. The characteristics of the sound-chamber are defined by the negative space, as well the structure of the protrusions of the interior face 516 of the first portion 501 and the second portion 503 into the negative space that forms the sound-chamber.

In some cases, the first portion 501 may further comprise a gas intake 507. The gas intake 507 may be an opening to the sound-chamber at a bottom end of the sound-chamber conduit, and is introduced into the mouth 509 of the bottle 520. The gas intake 507 may receive inputted gases (e.g., the pressurized gases escaping the bottle 520), and allow the gas to move through the sound-emitting cap-chamber 500. It should be appreciated that, in some embodiments, the gas intake 507 may be formed when, for example, a first portion 501 and a second portion 503 are abutted.

A bottle cap 511 may be coupled to the sound-emitting cap-chamber 500 apparatus, which in turn may be inserted into the mouth 509 of the bottle 520. In some embodiments, the bottle cap 511 may be placed on top of the sound-emitting cap-chamber 500 and affixed to the mouth 509. The bottle cap 511 may be affixed to the mouth 509 by, for example, symmetrical threads on the interior of the cap 511 that screws the cap 511 onto the exterior of the mouth 509.

A first seal 515 may inhibit pressurized gas from escaping where the cap 511 meets the mouth 509 when the sound-emitting cap-chamber 500 is inserted within the mouth 509 of a bottle 520. The first seal 515 may be situated between the underside of the cap 511 and the topside of the sound-emitting cap-chamber 500, circumscribing or ringing the top of the topside of the sound-emitting cap-chamber 500, and may be any material capable of sealing gas within the bottle. The bottle cap 511 may comprise a port 514 that allows the gas to escape through the gas intake 507 at the distal end of the sound-emitting cap-chamber 500. A vibrating mechanism may be coupled to, or situated within the opening of, the gas intake 507 of the distal end. Escaping gas vibrates the vibrating mechanism, thereby generating sound waves from the gas moving through the sound-emitting cap-chamber 500. A second seal 517 may be situated between the top of the sound-emitting cap-chamber 500 and the cap 511 about the escape hole 525. The second seal 517 may be any material capable of sealing gas within the bottle 520, thereby preventing gas from escaping where the cap 511 meets the escape hole 525 at the top, topside, and/or top-end of the sound-emitting cap-chamber 500.

Figure 6:
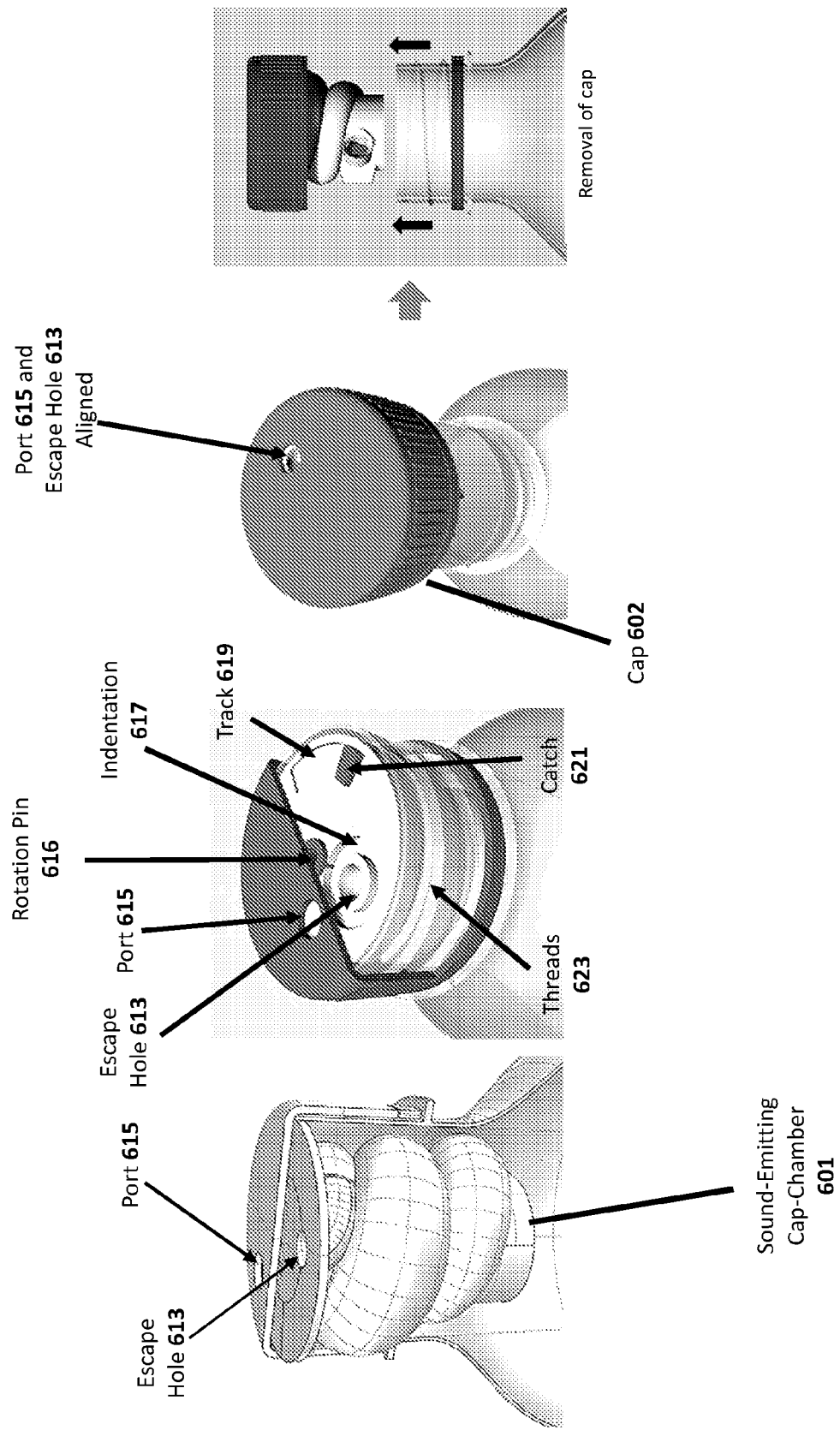
FIG. 6 shows components of a sound-emitting cap-chamber apparatus as the bottle is being opened by a consumer, according to an exemplary embodiment

FIG. 6 shows components of a sound-emitting cap-chamber 601 apparatus coupled to a bottle cap 602 and inserted into a bottle as it is being opened by a consumer, according to an exemplary embodiment. A portion of the sound-emitting cap-chamber 601 may comprise an escape hole 613 situated at a top of the sound-emitting cap-chamber 601 at an end of the sound-chamber. The escape hole 613 may have a size (e.g., diameter) substantially symmetrical to a corresponding port 615 in the bottle cap 602. The sound-emitting cap-chamber 601 may comprise an indentation 617 adjacent to and surrounding the escape hole 613 of the sound-emitting cap-chamber 601. The indentation 617 may be configured to receive a seal that may be inserted therein; the seal may inhibit gas from escaping the bottle via the escape hole 613 at the top of the sound-emitting cap-chamber 601.

The cap 602 may comprise a rotation pin 616 that may be fitted into a rotation hole of a top of the sound-emitting cap-chamber 601. The rotation hole may receive the rotation pin 616 at a middle point of the bottle cap 602, such that when the rotation pin 616 is inserted into the rotation hole, the bottle cap 602 may rotate (e.g., twist) as the consumer opens the bottle.

The cap 602 may comprise a catch 621 situated on the underside of the cap 602 that meets the sound-emitting cap-chamber 601. The catch 621 may be a portion of cap-material (e.g., plastic, aluminum) that juts into a track 619 situated at the top of the sound-emitting cap-chamber 601, where the track 619 may be an impression, notch, or dent on the topside of the sound-emitting cap-chamber 601. The top of at least one portion of the sound-emitting cap-chamber 601 may comprise the track 619 that accommodates the catch 621 at the underside of the bottle cap 602. The track 619 allows the bottle cap 602 to move (e.g., rotate) some rotational degree independently of the sound-emitting cap-chamber 601 for some controlled distance of travel. If an opening-motion (e.g., twisting) causes the catch 621 of the bottle cap 602 to meet the extent of the track 619 of the sound-emitting cap-chamber 601, then the threads 623 of the bottle cap 602 begin to be unscrewed from the threads 623 of the bottle. At some point before the cap 602 is entirely removed (e.g., unscrewed) from the mouth of the bottle, the port 615 of the cap 602 and the escape hole 613 of the sound-emitting cap-chamber 601 become aligned, thereby allowing the pressurized gas in the bottle to escape via the sound-emitting cap-chamber 601. As the opening-motion is continued, two parts of the sound-emitting cap-chamber 601 apparatus (i.e., the outer bottle cap and the sound-emitting cap-chamber) move together in unison, thereby allowing the sound-emitting cap-chamber 601 and the bottle cap 602 to be removed from the mouth of the bottle.

FIG. 7 shows a gas intake 700, according to an exemplary embodiment. The gas intake 700 may be integrally formed as part of the sound-emitting cap-chamber. In some cases, the gas intake 700 may be attached to a sound-emitting cap-chamber. The gas intake 700 may comprise a reed component 703 that attaches at or within the gas intake 700 of the sound-emitting cap-chamber. The reed component 703 may be a vibrating mechanism that generates sound waves when pressurized gas is forced into an intake hole 701 and through the gas intake 700. The sound waves may then travel through the sound-emitting cap-chamber as the gas escapes via the intake hole 701 through the sound-emitting cap-chamber.

Figure 8:
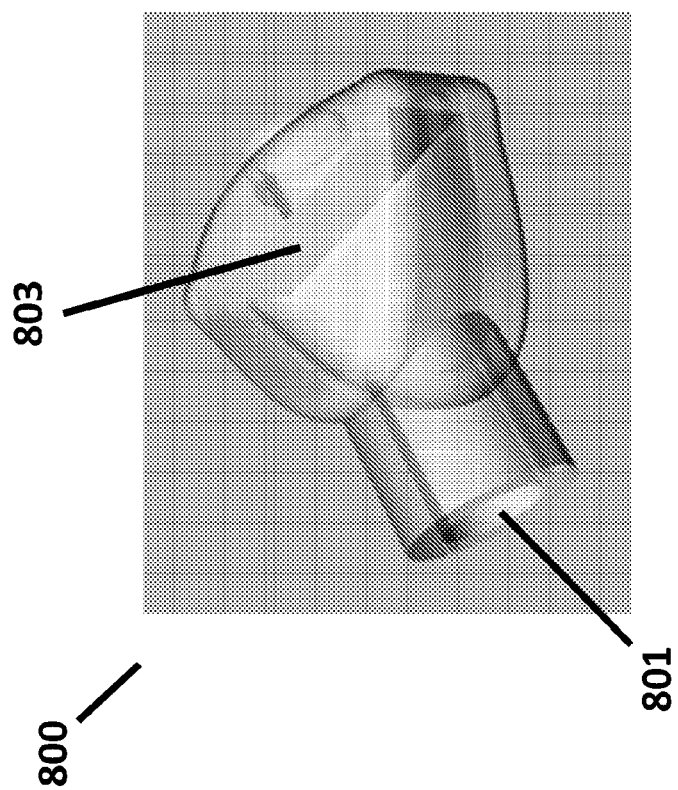
FIG. 8 shows a gas intake having a vibrating mechanism, according to another exemplary embodiment.

FIG. 8 shows a gas intake 800, according to another exemplary embodiment. The gas intake 800 may be integrally formed as part of the sound-emitting cap-chamber. In some cases, the gas intake 800 may be attached to a sound-emitting cap-chamber. The gas intake 800 may comprise a reed component 803 that attaches at or within the gas intake 800 of the sound-emitting cap-chamber. The reed component 803 may be a vibrating mechanism that generates sound waves when pressurized gas is forced into an intake hole 801 and through the gas intake 800. The sound waves may then travel through the sound-emitting cap-chamber as the gas escapes via the intake hole 801 through the sound-emitting cap-chamber.

FIG. 9 shows an exemplary sound-emitting cap-chamber 901 apparatus inserted into the mouth of a bottle. The sound-emitting cap-chamber 901 may comprise a gas intake at a distal end, where the gas intake has a vibrating mechanism 903 (e.g., reed component), similar to the gas intake shown in FIG. 7.

Design and Manufacture

Figure 10:
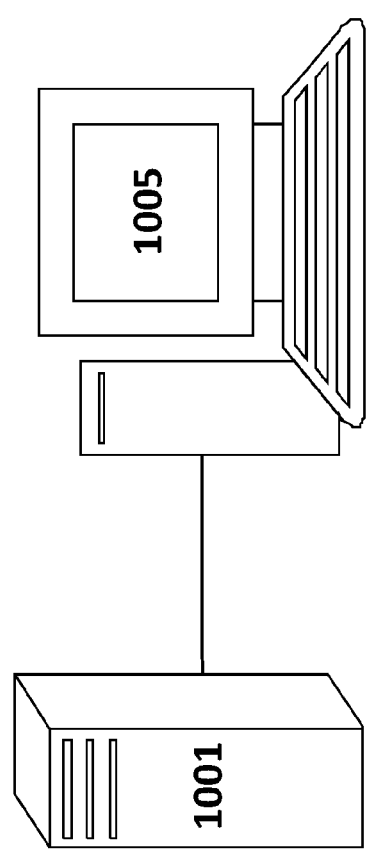
FIG. 10 shows an exemplary computing system for designing and manufacturing bottles and bottle caps.

FIG. 10 shows an exemplary computing system for designing and manufacturing sound-emitting cap chambers. The exemplary system comprises a modeling computer 1001 and a user device 1005. One having skill in the art would appreciate that other embodiments may comprise additional or alternative devices. In addition, in some embodiments, the various devices may be combined into a single device. For example, in some instances, the modeling computer 1001 and the user device 1005 may be the same computing device. It should be appreciated that other combinations of the devices may be possible as well.

In operation, a modeling computer 1001 or a user device 1005 may execute computer-aided design (CAD) software or other three-dimensional rendering and design software to design a model of a sound-chamber. A user may interact with the design software via a GUI allowing the user to "draw" an initial shape of a sound-chamber; an exemplary GUI-rendering for a sound-chamber model that would produce the "oh" sound may be seen in FIG. 11. In some cases, the initial shape of the sound-chamber may be drawn by a user via inputs into a GUI of the design software, which, in some instances, may be premised on a solid, physical three-dimensional model of a sound-chamber. The result is that the software receives user inputs to produce a virtualized model of a sound-chamber on the CAD software. In some cases, this initial sound-chamber model design may emulate the shape and size of a human windpipe making a desired sound. The same or related software may then generate a waveform output that would be produced by the model sound-chamber, according to the sound-chamber model generated using the design software. It should be appreciated that the modeling computer 1001 may be any computing device comprising a processor and non-transitory machine-readable storage medium, and capable of performing the various tasks and processes described herein. Non-limiting examples of a modeling computer 1001 may include a server, a desktop, a laptop, a tablet, and the like. In some implementations, the modeling computer 1001 may generate a waveform model or visual model based on the user inputs into the software, which the modeling computer 1001 may transmit to the user device 1005. The user device 1005 may then present the waveform on a GUI of the user device 1005.

As mentioned, the modeling computer 1001 or the user device 1005 may then generate a rendered model of a sound-chamber for reproducing a sound or waveform that would result from the sound-chamber, as "drawn" using the GUI of the CAD software. For instance, the modeling computer 1001 may generate the modeling data and/or GUI-rendering data and then transmit that data to the user device 1005 via one or more computer communication networks, which may function using one or more computer-networking protocols and related hardware. The modeling computer 1001 may receive various inputs from the user device 1005, which may instruct the modeling computer 1001 to adjust the sound-chamber model, such that the sound-chamber would make a different sound or waveform as adjusted from the initial visual inputs. It should be appreciated that the user device 1005 may comprise a non-transitory machine-readable storage medium and a processor, and may be capable of performing the various tasks and processes described herein. Non-limiting examples of a user device 1005 may include a server, a laptop, a desktop, a tablet, a mobile device (e.g., smart phone), and the like.

Figure 11:
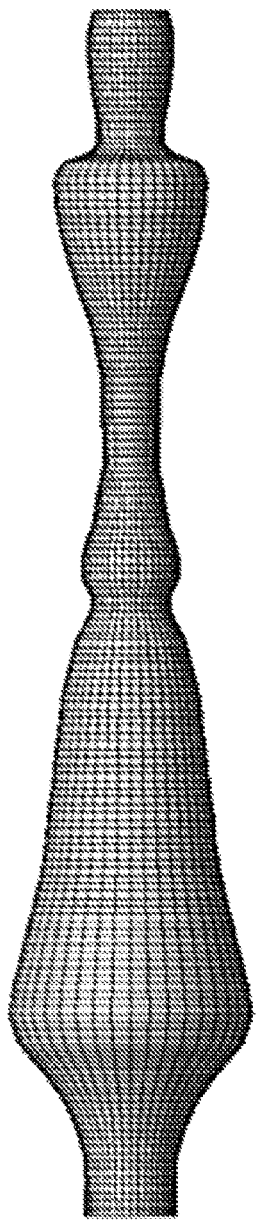
FIG. 11 shows an exemplary GUI-rendering display of a virtual model of a sound-chamber generated using design software.
Figure 12:
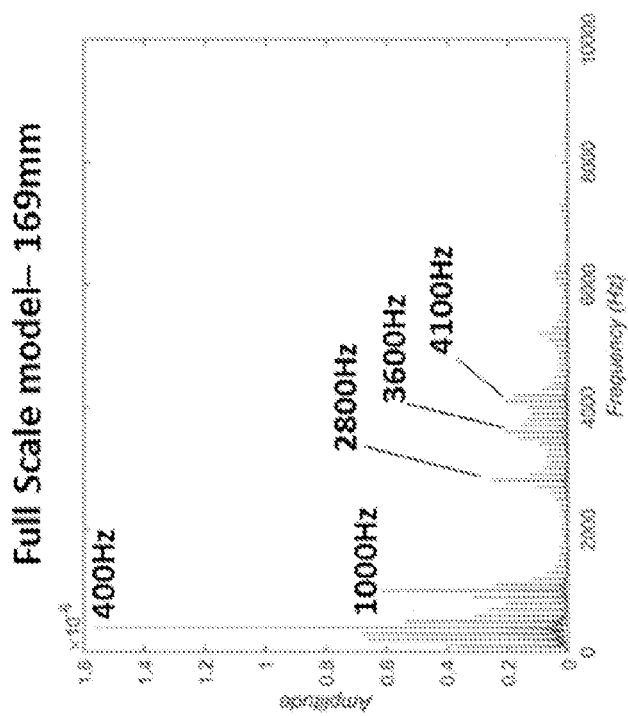
FIG. 12 shows an exemplary GUI displaying a waveform of what would be produced by a sound-chamber generated using design software.

FIG. 11 shows an exemplary GUI-rendering display of a virtual model of a sound-chamber as "drawn" by a user using a GUI of the design software. The software executed by the modeling computer 1001 or user device 1005 may receive a sound-chamber model and may generate a GUI-rendering of the sampled waveform, representing the waveform that would be generated from the virtual model sound-chamber produced by the user via the CAD software. FIG. 12 shows an exemplary GUI displaying a waveform of what would be produced by a sound-chamber generated using the CAD software.

As mentioned previously, in order to fit a modeled sound-chamber into a mouth of a bottle, the sound-chamber may require miniaturization—without losing the desired sound quality. As shown in FIG. 2, the sound-chamber may be re-shaped with a coiled effect. A resulting GUI-rendering may be seen in FIG. 3. Sound-modeling software may be used to generate, and, as needed, re-generate a waveform model of the coiled sound-chamber to confirm that sound quality is maintained, from the initially rendered model to the final coiled model. For example, rather than automating the dimensional resizing, the design software used to generate a virtual model of the sound-chamber and the sound-modeling software generating the waveform produced by the sound-chamber model may be used to resize the dimensions of the sound-chamber model in subsequent iterations under the control of the user. This permits the user to manipulate the various dimensions and structure of the sound-chamber model by trial and error, by reviewing simulated waveform outputs, as in FIG. 12, for the modeled sound-chamber, like in FIG. 11, whereby the user may shrink the sound-chamber model or change the internal structure of the chamber, and then output the waveform until a satisfactory sound-chamber is generated with the design software.

For manufacturing purposes, the virtual model of the sound-chamber, like that of FIG. 11, may be outputted as a machine-readable computing file that may be accessible and manipulated by later modeling software or manufacturing hardware, such as sound-modeling software, a computer configured to produce a mold, a computer controlling manufacturing using a mold, and the like. A mold may be generated by a mold-generating process, such as die-casting or 3D printing, according to the computing file containing the model sound-chamber. The mold may comprise protrusions and cavities such that, when the materials of the sound-emitting cap-chamber are introduced to the mold, the materials harden into the structure of the sound-emitting cap-chamber. One having skill in the art would appreciate that various processes and materials that may be employed to generate the mold using the sound-chamber model. Non-limiting examples of the materials of the mold may include metals (e.g., steel, iron), thermoplastics or thermosetting polymers, photopolymers, and the like. The mold may then be employed in the manufacturing process of the sound-emitting cap-chamber.

The sound-emitting cap-chamber may be manufactured using any number of processes. For example, a pre-fabricated mold may be employed to manufacture the sound-emitting cap-chamber using, e.g., injection molding, extrusion molding, and the like. In such examples, the sound-emitting cap-chamber may comprise metal (e.g., aluminum, steel), plastic (e.g., high or low density polyethylene, polypropylene), or the like. As another example, the sound-emitting cap-chamber may be generated by 3D printing using the virtual model of the sound-chamber from the design software, which may be outputted or converted to an additive manufacturing file (AMF) or the like. In such examples, the sound-emitting cap-chamber may comprise any material used by a 3D printing apparatus (e.g., photopolymers, thermoplastic).

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A sound-emitting cap-chamber system comprising:
    a sound-chamber having a substantially wrapped shape, and comprising:
        a first hole at a bottom end of the sound-chamber;
        a second hole at a top end of the sound-chamber;
        a vibrating mechanism situated at the first hole and configured to generate one or more sound waves from a pressurized gas entering the first hole; and
    a cap of a bottle, configured to cover the sound-chamber and comprising a port hole.

2. The sound-emitting bottle cap system of claim 1, wherein the sound-chamber defines a cavity space that is internal to the sound-chamber, and further comprises one or more protrusions into the cavity space of the sound-chamber, and
    wherein each protrusion of the sound-chamber is defined by a diameter that is different from a diameter of at least one of the first hole and the second hole, thereby disturbing the one or more sound waves from the pressurized gas to generate a series of sounds having audible characteristics defined by the one or more protrusions.

3. The sound-emitting bottle cap system of claim 1, wherein the cap further comprises a catch, and wherein the sound-chamber further comprises a track configured to accommodate the catch of the cap.

4. The sound-emitting bottle cap system of claim 3, the cap further comprising a rotation pin on an underside of the cap, and wherein the sound-chamber further comprises a rotation hole configured to accommodate the rotation pin of the cap.

5. The sound-emitting bottle cap system of claim 4, wherein the rotation hole is configured to facilitate a rotation motion of the cap, and wherein the track is further configured to facilitate travel of the catch a length of the track.

6. The sound-emitting bottle cap system of claim 5, wherein the first hole is configured to align with the port hole of the cap at a first travel distance of the rotation motion of the cap, and wherein the pressurized gas escaping through the port hole and the first hole via the sound-chamber upon alignment of the first hole and the port hole.

7. The sound-emitting bottle cap system of claim 1, further comprising a first seal situated between a top surface of the sound-chamber and an underside of the cap, surrounding the top surface of the sound-chamber, and configured to inhibit the pressurized gas from escaping via a space between the top surface of the sound-chamber and the cap.

8. The sound-emitting bottle cap system of claim 1, further comprising a second seal situated between a top surface of the sound-chamber and an underside of the cap, surrounding the second hole, and configured to inhibit the pressurized gas from escaping via a space at the second hole between the top surface of the sound-chamber and the underside of the cap.

9. The sound-emitting bottle cap system of claim 1, wherein the vibrating mechanism is configured to vibrate in response to pressurized gas entering the sound-chamber via the first hole.

10. The sound-emitting bottle cap system of claim 1, further comprising a gas intake attached to the first hole, wherein the first hole comprises the vibrating mechanism.

11. The sound-emitting bottle cap system of claim 1, wherein the cap further comprises one or more threads configured to affix the cap to the bottle via one or more corresponding threads of the bottle.

12. A sound-emitting cap-chamber apparatus comprising:
    a conduit defining a cavity space therein, the cavity space having a substantially wrapped shape and comprising one or more protrusions therein;
    a first hole situated at a bottom end of the conduit;
    a second hole situated at a topside of the apparatus and at a top end of the conduit; and
    a vibrating mechanism situated at the first hole and configured to generate one or more sound waves from a pressurized gas entering the first hole.

13. The sound-emitting cap-chamber apparatus of claim 12, wherein each protrusion is defined by a diameter that is different from a diameter of at least one of the first hole and the second hole, thereby disturbing the one or more sound waves from the pressurized gas to generate a series of sounds having audible characteristics defined by the one or more protrusions.

14. The sound-emitting cap-chamber apparatus of claim 12, further comprising a track defined by an impression in the topside of the apparatus and accommodates a catch of a cap.

15. The sound-emitting cap-chamber apparatus of claim 14, further comprising a rotation hole configured to accommodate a rotation pin of the cap.

16. The sound-emitting cap-chamber apparatus of claim 15, wherein the rotation hole is configured to facilitate a rotation motion for the cap, and wherein the track is further configured to facilitate travel of the catch a length of the track.

17. The sound-emitting cap-chamber apparatus of claim 16, wherein the first hole is configured to align with a port of the cap at a first travel distance of the rotation motion of the cap, and wherein the pressurized gas escaping through the port and the first hole via the conduit upon alignment of the first hole and the port.

18. The sound-emitting cap-chamber apparatus of claim 12, further comprising a first indentation circumscribing the topside of the apparatus and configured to accommodate a first seal.

19. The sound-emitting cap-chamber apparatus of claim 18, further comprising a second indentation circumscribing the second hole situated at the topside of the apparatus and configured to accommodate a second seal.

20. The sound-emitting cap-chamber apparatus of claim 12, wherein the vibrating mechanism is configured to vibrate in response to pressurized gas entering the conduit via the first hole.

* * * * *